(No Model.)
H. JOHNSON.
PIPE JOINT.
No. 408,719. Patented Aug. 13, 1889.
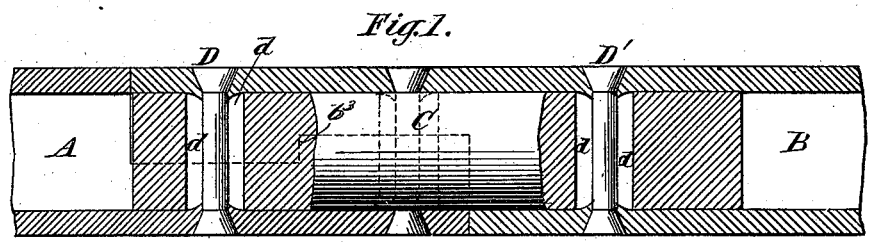
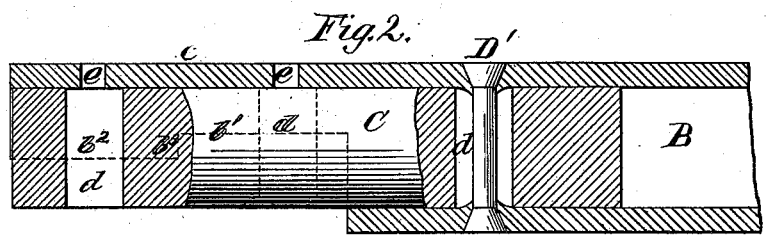
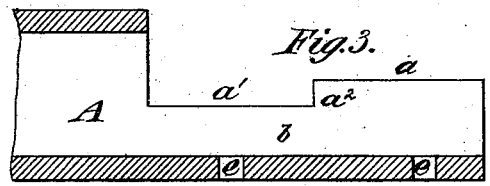

UNITED STATES PATENT OFFICE.

HENRY JOHNSON, OF JERSEY CITY, NEW JERSEY.

PIPE-JOINT.

SPECIFICATION forming part of Letters Patent No. 408,719, dated August 13, 1889.

Application filed July 28, 1888. Serial No. 281,314. (No model.)

*To all whom it may concern:*

Be it known that I, HENRY JOHNSON, a subject of the Crown of Great Britain and Ireland, residing at Jersey City, in the county of Hudson and State of New Jersey, have invented a new and useful Improvement in Pipe and Rod Joints, of which the following is a specification.

I will describe in detail a pipe and rod joint embodying my invention, and then point out the novel features in the claims.

I have shown my improvement as in use with pipes.

In the accompanying drawings, Figure 1 is a longitudinal section of two portions of a pipe, showing a joint therefor embodying my invention, a certain portion of a plug employed therein being shown in full lines. Fig. 2 is a similar view showing one of the pipes disconnected at the joint from the other pipe, and Fig. 3 is a similar view showing the second of the pipes also disconnected.

Similar letters of reference designate corresponding parts in the several figures.

My improved joint is designed to be employed in jointing pipes or rods used for operating railway-switches, signals, and analogous contrivances; but it may be employed for other purposes. It embodies, essentially, the union of two pipes or rods by means of a notched or scarfed joint, whereby, when the pipes are placed together, they are locked against longitudinal separation. Combined with the pipes or rods and extending across the joint upon the inside of the same is a metal plug, which may be of cast or malleable iron, and which is secured in the pipes or rods against longitudinal movement after having been inserted therein.

A designates one of the pipes, and B the other. The pipes I have shown as notched near their ends in such manner as that when placed together they will form a scarfed joint; but I may employ any convenient means of notching the pipes, so as to prevent their longitudinal separation. The pipe A is provided with a tongue-like portion $b$, near the outer end of which are formed upon each side upwardly extending or projecting portions $a$. At the point of union between the upwardly-projecting portions $a$ and the tongue-like portion $b$ is formed a square shoulder $a^2$. Between the upwardly-projecting portions $a$ and the main or body portion of the pipe A are recesses or depressions $a'$. The upwardly-projecting portions $a$ upon the tongue-like portion $b$ of the pipe A extend into recesses or depressions $b'$, formed in a tongue-like portion $c$ of the pipe B, while the recessed or depressed portions $a'$ of the tongue-like portion $b$ of the pipe A receive projections $b^2$ upon the tongue-like portion $c$ of the pipe B. At the point of union between the projecting portions $b^2$ of the pipe B and the tongue portion $c$ of the pipe B are formed squared shoulders $b^3$, which shoulders, when the two pipes are placed together, abut against the shoulders $a^2$ on the pipe A. It will therefore be seen that when placed together the pipes cannot be separated by a longitudinal movement.

I prefer that the plug C should be secured in either the pipe A or the pipe B previous to the joining of the two pipes; in fact, it may be so secured where the pipes are manufactured and may be shipped with the pipes. I have shown the plug so secured in the pipe B in Fig. 2, but do not consider this wholly essential.

Extending through the plug C at right angles to the axis thereof are apertures $d$. Through these apertures and through opposite apertures $e$ in the pipes pass rivets or bolts D D'. The apertures $d$ are preferably of greater extent laterally than the said rivets or bolts, and also than the apertures $e$, provided to receive the bolts in the pipes, as shown more clearly in Figs. 1 and 2. Said apertures $d$ may be of greater lateral extent than the bolts in all directions, but preferably only in the direction of the length of the pipes and plug, in which case they will be in the form of slots. By thus forming the apertures I am enabled, when the rivets are being inserted, to press or drive inwardly portions of the metal above the heads of the rivets or bolts, which portions of metal will extend into the apertures $d$, and will act as a lock to prevent longitudinal movement of the plug C and avoid all tendency to shearing rivets.

By my invention a very rigid joint is formed, which not only is effectually locked against longitudinal breakage, but by means of the plug is secured against breakage or displacement in a transverse direction.

What I claim as my invention, and desire to secure by Letters Patent, is—

1. The combination, with two pipes having interlocking end portions, of a plug arranged within the pipes and extending across said interlocking end portions, and rivets or bolts extending through the pipes and the plug, substantially as herein described.

2. The combination, with two pipes having interlocking end portions, of a plug arranged within said pipes and extending across said interlocking end portions, said plug being provided with transversely-extending apertures, and rivets or bolts extending through said pipes and the apertures in the plug, said apertures being larger than the exterior of the rivets or bolts, substantially as and for the purpose herein described.

HENRY JOHNSON.

Witnesses:
FREDK. HAYNES,
HENRY J. MCBRIDE.